(12) United States Patent
Gavarini et al.

(10) Patent No.: US 7,874,385 B2
(45) Date of Patent: Jan. 25, 2011

(54) SELF-MOVING CAR FOR THE MOVING OF TRAILER MACHINES AND OF STATIC MACHINES OR THE LIKE

(75) Inventors: Marco Gavarini, Citta di Castello (IT); Massimo Gavarini, Citta di Castello (IT)

(73) Assignee: Gavarini S.R.L., Citta di Castello PG (IT)

( * ) Notice: Subject to any disclaimer, the term of this patent is extended or adjusted under 35 U.S.C. 154(b) by 60 days.

(21) Appl. No.: 12/516,925

(22) PCT Filed: Nov. 28, 2007

(86) PCT No.: PCT/IB2007/054824
§ 371 (c)(1),
(2), (4) Date: May 29, 2009

(87) PCT Pub. No.: WO2008/068670
PCT Pub. Date: Jun. 12, 2008

(65) Prior Publication Data
US 2010/0071968 A1   Mar. 25, 2010

(30) Foreign Application Priority Data
Dec. 6, 2006   (IT) .............................. RM06A0657

(51) Int. Cl.
*B62D 11/04* (2006.01)
(52) U.S. Cl. .................................. 180/6.48; 280/479.1
(58) Field of Classification Search ................ 180/6.48, 180/6.5; 280/479.1, 478.1; 414/434, 435, 414/470
See application file for complete search history.

(56) References Cited

U.S. PATENT DOCUMENTS

| | | | |
|---|---|---|---|
| 3,844,671 A | 10/1974 | Domenighetti | |
| 7,258,181 B2 * | 8/2007 | Hammonds | 180/6.48 |
| 7,712,556 B2 * | 5/2010 | Hammonds | 180/6.5 |
| 7,762,361 B2 * | 7/2010 | Hammonds | 180/6.48 |

FOREIGN PATENT DOCUMENTS

WO   2006/000822   1/2006

OTHER PUBLICATIONS

PCT International Search Report for PCT/IB2007/054824 filed on Nov. 28, 2007 in the name of Gavarini S.R.L.

(Continued)

*Primary Examiner*—Kevin Hurley
(74) *Attorney, Agent, or Firm*—Steinfl & Bruno LLP

(57) ABSTRACT

A self-moving car (1) for the moving of trailer machines (100), comprising a main chassis (2); wheels (4', 4") engaged with the chassis (2); a generating and feeding unit (5) and movable means (20) for coupling the car (1) with a trailer machine (100) to be towed; the car (1) further comprising an apparatus (80) for the articulated connection to the chassis (2) of the movable coupling means (20), comprising a pin (8) hinged to the chassis (2), the pin (8) having a first bottom end (9) connecting to actuating means (11) for the bilateral rotation (beta) of the pin (8), so that to the rotation of the pin (8) there corresponds a proportional variation of tilt of said movable coupling means (20) with respect to the ground plane; and a second top end (10) for the rotating coupling to the movable coupling means (20); the car (1) further comprising independent driving means, so that to a differential rotation of the wheels (4', 4") there corresponds a proportional rotation (&ggr;) of the movable coupling means (20) relative to the chassis (2), about a substantially longitudinal axis (C-C) of the pin (8).

20 Claims, 4 Drawing Sheets

OTHER PUBLICATIONS

PCT Written Opinion for PCT/IB2007/054824 filed on Nov. 28, 2007 in the name of Gavarini S.R.L.

PCT International Preliminary Report on Patentability for PCT/IB2007/054824 filed on Nov. 28, 2007 in the name of Gavarini S.R.L.

* cited by examiner

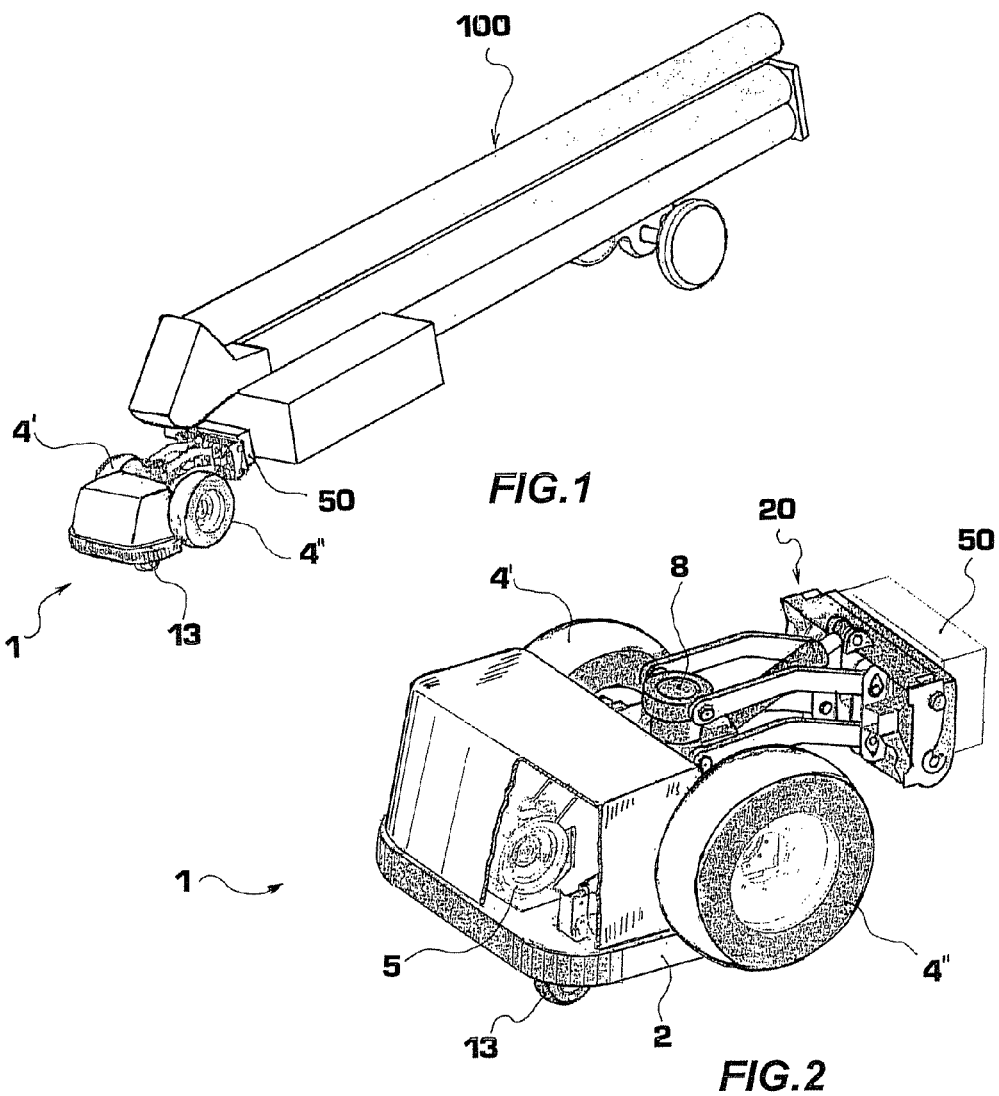
FIG.1
FIG.2
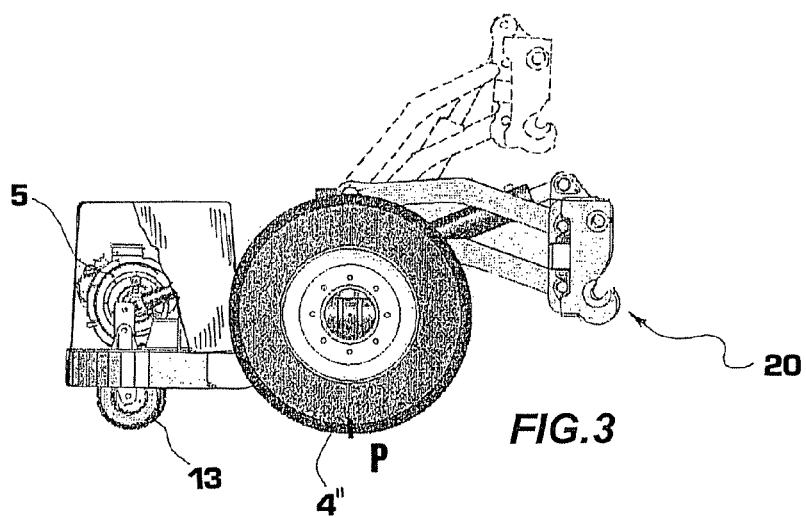
FIG.3

US 7,874,385 B2

SELF-MOVING CAR FOR THE MOVING OF TRAILER MACHINES AND OF STATIC MACHINES OR THE LIKE

CROSS REFERENCE TO RELATED APPLICATIONS

The present application is the US national stage of International Application PCT/IB2007/054824 filed on Nov. 28, 2007 which, in turn, claims priority to Italian Application RM2006A000657, filed on Dec. 6, 2006.

The present invention refers to a self-moving car for the moving of trailer machines and of static machines or the like, and specifically for elevating yard machines, such as cranes and the like.

This typology of self-moving cars finds application in the field of mechanic constructions for industrial applications and civil engineering, and typically in the building industry field for the moving of tower cranes, used e.g. in the building of dwelling houses.

In the current state of the art, in the reference field of yard machines, self-moving cars for the driving and moving of cranes are known, which however do not effectively associate to the strength and safety of the coupler a corresponding maneuverability and autonomy of motion.

Such a drawback is highlighted in a manner particularly unfavorable, as well as detrimental to a correct operation, when having to intervene on yards of difficult access, limited extension and reduced width, or anyhow in cramped spaces.

Typically, said conditions occur when the yard is set up with the aim of restructuring a building that, by not being newly-built, is already embedded in a definite town-planning context and on an area that is not totally unobstructed.

In fact, in such a case it is quite frequent to incur into problems of interference of yard machines with the pre-existing constructions, even establishing the insurmountable impossibility of driving, on the site singled out, vehicles apt to carry out the envisaged restoration intervention.

Moreover, current yard machines, referring in particular to self-moving cars for the towing of cranes, have no effective devices for compensating for anomalies on the intervention ground and for balancing the uneven configuration of the yard site.

Currently marketed self-moving cars for the towing of elevating yard machines and the like, do not stand out for broad versatility of modes and positions for coupling to a trailer machine.

Moreover, solutions of anchoring to a trailer machine are not generally such as to ensure a grip that is safe, lasting and useful to a rational allocation of loads.

In fact, usually a strain concentration is created on the point of coupling between self-moving car and trailer machine.

Instead, it would be advisable, in order to optimize its structural sturdiness, to design the connection so that strains be discharged and distributed on more extended mechanical parts.

In the known art there is no self-moving car for the moving of trailer machines and of static machines or the like allowing easy coupling, stable towing and, concomitantly, intervention also on unfavorable ground conditions, on yards of difficult access and/or cramped.

Hence, object of the present invention is to solve said problems, by proposing a self-moving car as defined in claim 1.

Advantageously, the self-moving car according to the present invention accommodates stresses deriving by the state of the area of intervention, moreover exhibiting a high mobility on-yard, on excavation and generally on any ground condition in the worksite.

The car according to the present invention is equipped with a compact and reliable system for the connection to a trailer machine, integrating simple, sturdy mechanical linkages designed so as to ensure a wide range of anchoring modes and positions.

The agility of the car according to the present invention further allows an extended operative maneuverability even when leeway for intervention is minimal, even approaching close to a wall.

The steering system of the self-moving car according to the present invention and the flexibility of orientation of the means for coupling with a trailer machine ensure optimal circulation.

The technical solution contrived for carrying out an adjustable connection between the chassis of the car and means for coupling the car with a trailer machine to be towed is such as to minimize breakage and maintenance frequency.

Thanks to its versatility and simplicity of manufacturing, the car according to the present invention easily adjusts to the pre-existing structure of any type and configuration of trailer machine, entailing no substantial and demanding modifications to said coupling means.

Further advantages, as well as the features and the operation modes of the present invention will be made apparent from the following detailed description of a preferred embodiment thereof, given by way of example and not for limitative purposes. Reference will be made to the figures of the annexed drawings, wherein:

FIG. 1 is a perspective view of a preferred embodiment of the self-moving car according to the present invention, when in an operative configuration of coupling to a trailer machine;

FIG. 2 is a partially sectional perspective view of the self-moving car of FIG. 1, when in a configuration uncoupled from the trailer machine, apt to highlight the integrated mechanisms thereof;

FIG. 3 is a partially sectional side view of the self-moving car of FIG. 2, wherein it is exemplified the mobility of means for coupling the car with said trailer machine;

Figure 10:
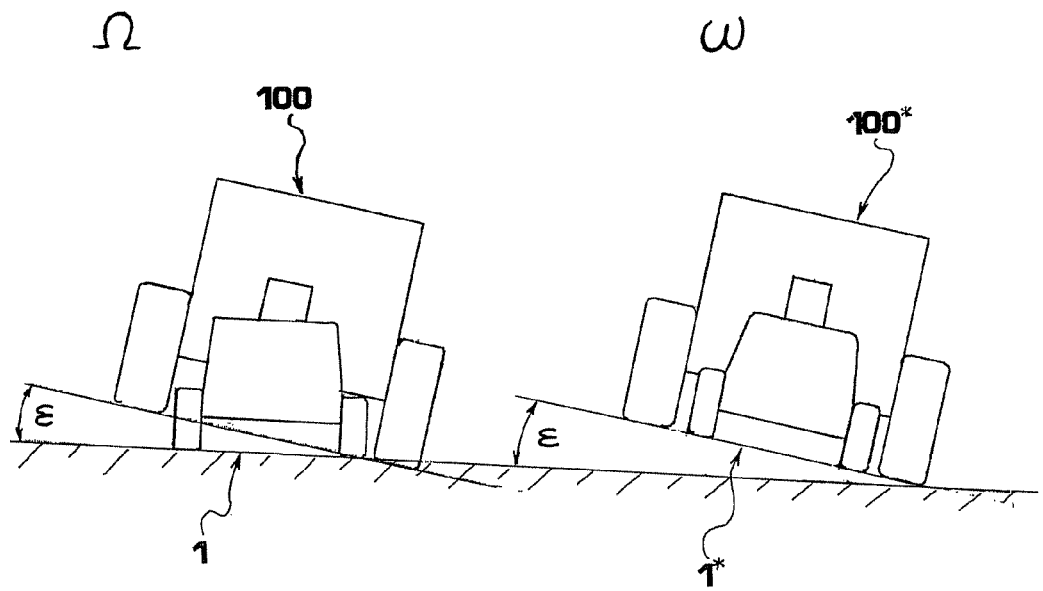
Figure 11:
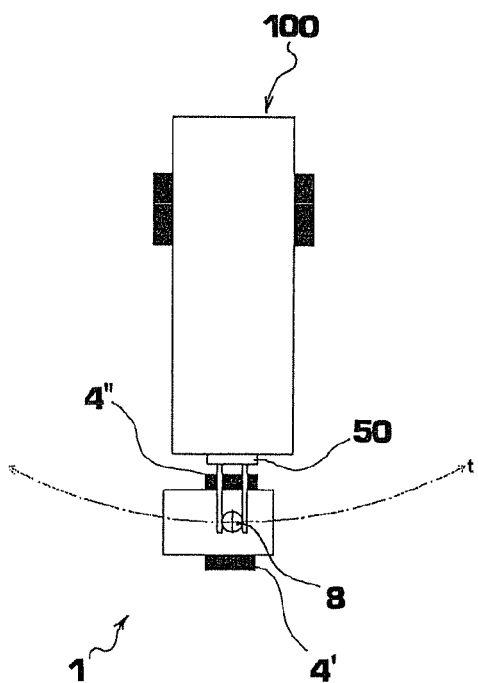

FIG. 10 is a comparative schematization of two situations, in both of which a self-moving car and the trailer machine towed thereby lie on different planes, apt to illustrate respectively the configuration assumed in the cases in which for the moving of the trailer machine the self-moving car according to the present invention, or a known self-moving car is used; and FIG. 11 is a top plan view of the self-moving car according to the present invention, when in the operative condition of coupling to a trailer machine of FIG. 1, apt to highlight the maneuverability thereof.

To describe the present invention, hereinafter reference will be made to the above-indicated figures.

As it may be observed in FIGS. 2 and 3, a self-moving car 1 for the moving of trailer machines 100 and of static machines or the like according to the present invention comprises a main chassis 2 and wheels 4 engaged with the chassis 2 through a drive axle 3.

The energy required to produce the movement of the car 1 on the ground, and to its operativeness, is delivered by a generating and feeding unit 5, housed on the chassis 2 and integrated in an external carter 6.

The generating and feeding unit 5 typically comprises main driving means, e.g. electric or endothermic, for generating the energy required for car operation.

This energy is usable by service using means, by actuating means and then by secondary driving means, e.g. oil-dynamic engines for the driving of the wheels 4.

Among service using means there may be envisaged working machines, like, e.g., pumps, coupled to a circuit for regulating, transferring and converting energy produced by the main engines.

For instance, a primary engine may be connected to a pump that is coupled to a fluid-dynamic circuit in which a fluid flow, collected from and reconducted to a tank, allows the transfer, regulation and distribution of energy in fluid form.

This energy is finally converted into mechanical energy by end actuators, e.g. oil-dynamic engines associated to the wheels 4.

Moreover, said actuating means may comprise telescopic pistons, e.g. hydraulic, oil-dynamic or pneumatic ones.

The self-moving car 1 according to the present invention further comprises movable means 20 for coupling the car with a trailer machine 100 to be towed.

Figure 6:
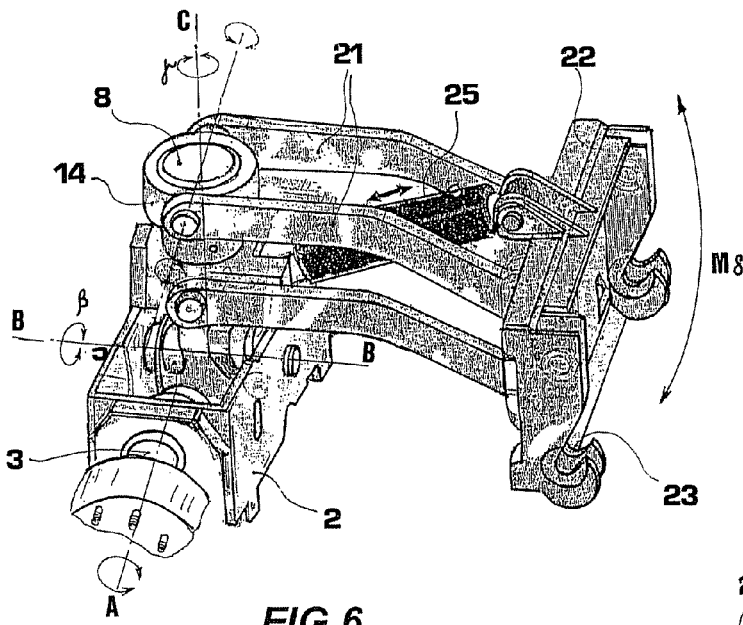
FIG. 6 is a perspective view of a portion of the self-moving car of FIG. 2, apt to highlight structure and degrees of freedom thereof.
Figure 7:
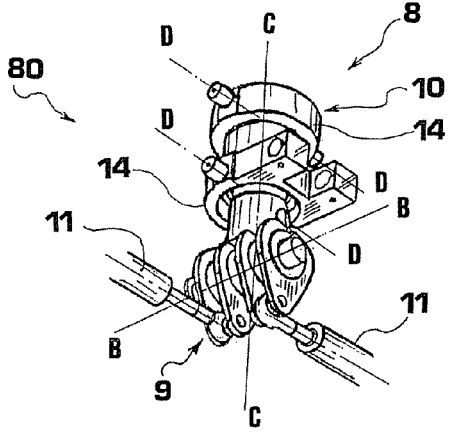
FIG. 7 is a perspective view of an apparatus for the articulated connection between the chassis of the self-moving car of FIG. 2 and the coupling means of FIG. 3.
Figure 8:
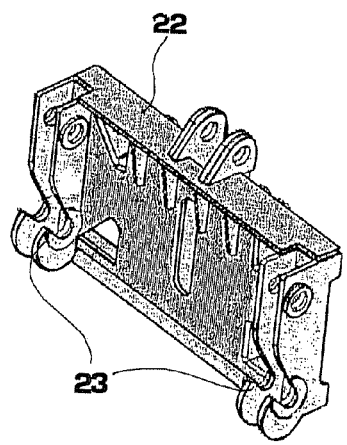
FIG. 8 is a perspective view of a detail of said coupling means of FIG. 3.

As depicted in FIG. 6, and in detail in FIG. 7, the car 1 further comprises an apparatus 80 for the articulated connection to the chassis 2 of said movable coupling means 20.

The design strategy provides that the mechanical linkages apt to give peculiar flexibility and maneuverability to the car 1 according to the present invention be substantially transferred to said apparatus 80 for the articulated connection.

Advantageously, moreover, to said articulated connection apparatus 80 there are transmitted and returned the more considerable loads created when the car 1 is coupled to a trailer machine 100.

Thus, contextually to a remarkable lightening of the stresses burdening it, it is allowed an extreme constructive simplification of the coupling of the car 1 with the trailer machine 100, traditionally a point of criticality in known cars due to its intrinsic dynamic-structural complexity.

By virtue of this, the coupling of the car 1 with the trailer machine 100 may also be made substantially rigid, without any limitation whatsoever to the option of regulating and controlling the coupling to the trailer machine 100.

The apparatus 80 for the articulated connection comprises a pin 8 hinged to the chassis 2 substantially at the height of the axis of rotation of the wheels 4.

With regard to the above-introduced preferred embodiment, the pin 8 is hinged to the chassis 2 exactly at the height of the axis of rotation of the wheels 4.

The pin 8 has a first bottom end 9 for connecting to actuating means 11 for the bilateral rotation β of the pin 8 about an axis of rotation B-B, substantially perpendicular to the axis of rotation A-A of the wheels 4 or substantially parallel to the direction of motion.

Thus, to the rotation of the pin 8 there corresponds a proportional variation of tilt of the movable coupling means 20 with respect to the ground plane.

By virtue of a suitable calibration and adjustment of said actuating means 11, there may be arranged and managed, respectively: the positioning of the coupling means 20, when the car 1 is moved in an unloaded configuration unconstrained by the trailer machine 100; then the orientation and the tilt of the movable coupling means 20 in accordance with ground configuration and location of the trailer machine 100, in the step of coupling the car 1 to the trailer machine 100; and finally the compensating for ground irregularities, possible gradients and the balancing, optionally cushioned, of the rotating connection between trailer machine 100 and car 1 when these are in a towing operative configuration, so as to allow the relative rotation thereof.

The actuating means for the bilateral rotation 13 of the pin 8 is preferably jacks 11, each of which is connected, at a first end thereof, to the chassis 2, and, at a second end thereof, to the bottom end 9 of the pin 8.

Figure 4:
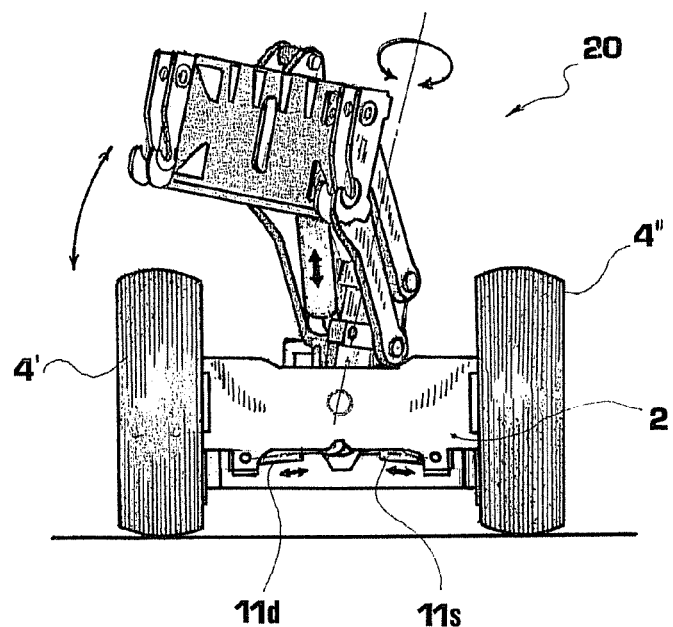
FIG. 4 is a front view of the self-moving car of FIG. 2.
Figure 5:
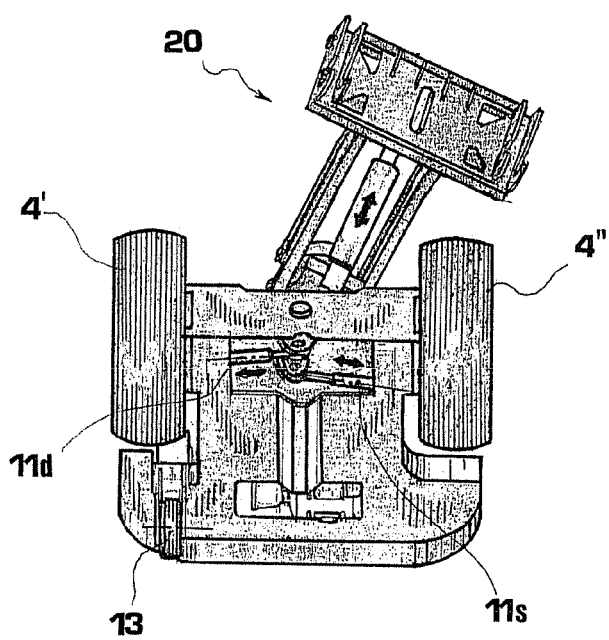
FIG. 5 is a bottom plan view of the self-moving car of FIG. 2.
Figure 9:
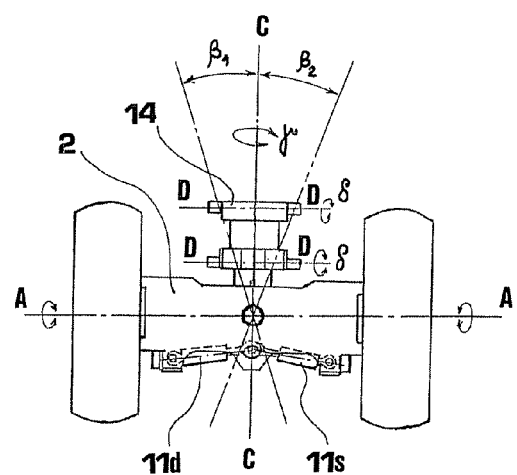
FIG. 9 is a partially sectional front view of the basic structure of the self-moving car of FIG. 2.

In the case at issue, as it may be observed in FIGS. 4, 5 and in particular in FIGS. 7 and 9, the actuating means may take on the shape of a pair of telescopic pistons $11d,11s$, symmetrically positioned on opposite sides relative to the longitudinal axis C-C of the pin 8.

Each of the pistons $11d,11s$ is apt to cause a rotation on mutually opposite senses $β_2,β_1$ of the pin 8 about the axis of rotation B-B.

Thus, the tilt of the movable coupling means 20 with respect to the ground plane may be varied, as it may be inferred from FIG. 4, in a width range substantially of from 0° to 15°.

Therefore, the angles $β2,β1$ may assume values ranging from 0° to 15°.

The width of the arcs that the movable coupling means 20 can describe when tilting by said modes, descends from the adopted constructive solution of advantageously hinging the pin 8 substantially at the height of the axis of rotation A-A of the wheels 4.

The pin 8 also has a second top end 10 for the rotating coupling to the movable coupling means 20.

Said movable coupling means 20 preferably comprises a parallelogram arm 21, hinged to the pin 8 at the second end 10; and a detachable coupling flange 22 at the trailer machine 100.

The hinging of the arm 21 allows a rotation 5 thereof with respect to the pin 8 about an axis D-D, useful to attain a proportional raising and lowering $M_δ$ of the coupling flange 22, in accordance with the position onto the trailer machine 100 of the interface for coupling to the car 1.

For this purpose, the parallelogram arm 21 is preferably moved by a telescopic hydraulic cylinder 25.

As illustrated in FIG. 6, the second top end 10 for the rotating coupling comprises rotating supports 14 apt to allow a rotation γ of the parallelogram arm 21 with respect to the chassis 2, about a substantially longitudinal axis C-C of the pin 8.

Such rotating supports 14, e.g. mounted on cylindrical roller bearings, are contrived so as to allow an overall rotation γ of the movable coupling means 20 with respect to the chassis 2, for specific configurations of the self-moving car, of up to 360°, respectively of 180° in a first sense and of 180° in a second sense opposite to said first one.

The detachable coupling flange 22 may be removable, thereby being interchangeable, according to the configuration of a respective counterflange 50 of the trailer machine 100 that, for each specific case, has to be towed.

The coupling of the flange 22 is attainable by a system comprising pins 23 apt to engage into respective slots.

The flange 22 may also be directly applied to the pin 8, upon removal of the parallelogram arm 21.

In this case, the configuration resulting from such a coupling mode appears structurally associable to that of the connections between the traditional car and trailer machine, concomitantly keeping unaltered the advantageous functionality of the pin 8 introduced in the apparatus 80 for the articulated connection of the car 1 according to the present invention.

The car 1 according to the present invention may further comprise independent driving means, each of them being suitable for the drive of respective wheels 4, so that to a differential rotation of the wheels there corresponds a proportional rotation γ of the movable coupling means 20 relative to the chassis 2, about a substantially longitudinal axis C-C of the pin 8.

With regard to the preferred embodiment of the present invention detailed here, the main train of tires of the self-moving car 1 comprises a pair of wheels 4',4" on respective opposite sides of the chassis 2.

Each wheel of said pair of wheels 4',4" is preferably moved by a respective independent engine.

A joint rotation of the wheels 4',4" with respectively different speeds, produces a proportional steering.

Following a joint rotation of the wheels 4',4" with respective opposite-sign speeds, or as a consequence of a rotation in a mutually opposite sense of the wheels 4',4", the car 1 acquires a spinning motion.

Such a spinning option advantageously allows the car 1 according to the present invention to assume, substantially remaining in place, positions that are transversal with respect to the trailer machine, as depicted in FIG. 11, and then to follow substantially curved, and optionally circular, paths t.

There ensues a remarkable steering agility of the car 1 according to the present invention.

In order to increase its agility and broaden its versatility of use, the self-moving car 1 according to the present invention may be equipped with a jockey wheel 13 for stabilizing the balance of the car 1 when moved in the configuration devoid of a trailer machine 100.

The jockey wheel 13 is preferably free to rotate idle about a vertical axis thereof and substantially perpendicular to the ground.

The jockey wheel 13 is also preferably telescopic, its deployment being adjustable in height with a vertical translation.

Thus, it is obtained a proportional rotation of the car 1 about a median point P of the impression from the bearing down of the wheels 4,4',4".

The jockey wheel 13 is preferably positioned substantially in line with the wheels placed at one of the two viable sides of the main train of tires.

Thanks to the solution of a jockey wheel 13 aligned to the wheels placed at one of the sides of the chassis 2, the car 1 can easily ascend and descend ramps.

In the schematizations of FIG. 10 there are exemplified, by way of comparison, two situations Ω, ω, in both of which a self-moving car and the trailer machine towed thereby lie on different planes, staggered therebetween of an angle ε.

These schematizations Ω, ω are apt to illustrate the configuration assumed by the car-trailer machine system, respectively in the cases in which for the moving of the trailer machine the self-moving car according to the present invention, integrating said articulation apparatus 80, or a known-art self-moving car is used.

It is evident from the illustration of situation Ω how advantageously the self-moving car 1 according to the present invention can rotate with respect to the trailer machine 100 about an axis substantially parallel to the direction of motion, tilting so as to continue gripping onto the ground for a total controllability and stability of the moving.

Instead, the known art, as it may be inferred from the schematization of situation w, entails the drawback of not allowing, if the coupling between car and trailer machine is kept substantially rigid, an adjustment of the relative positions between car and trailer machine such as to ensure a desirable grip onto the ground by the drive wheels of the car.

The car 1 according to the present invention can be remotely controlled, e.g. via a radio, by an operator who, by remotely acting on a related control unit, may arrange for its maneuvers, as well as for the modes of coupling to the trailer machine 100 and of entailed towing/moving thereof.

According to a further embodiment, by effecting suitable structural modifications, in lieu of the wheels 4 there may be used tracks for the movement of the car 1 onto the ground.

Optionally, the energy developed by the motorized car 1 can advantageously be used to facilitate the drive of the wheels of the trailer machine 100, thanks to a related drive system.

The present invention has hereto been described according to a preferred embodiment thereof, given by way of example and not for limitative purposes.

To the above-described self-moving car 1 for the moving of trailer machines 100 and of static machines or the like, a person skilled in the art, in order to satisfy further and contingent needs, may effect several further modifications and variants, all however encompassed within the protective scope of the present invention, as defined by the appended claims.

The invention claimed is:

1. A self-moving car for moving machines, the self-moving car comprising:
  a main chassis;
  wheels engaged with said main chassis, the wheels having an axis of rotation;
  a generating and feeding unit, apt to deliver an energy required to produce a movement of said car on ground, and to operate said car; and
  movable coupling means for coupling said car with a machine to be towed;
  said car further comprising an apparatus for an articulated connection of said movable coupling means to said main chassis, the apparatus comprising a pin hinged to said main chassis at a height of the main chassis substantially corresponding to the axis of rotation of said wheels, said pin comprising:
    a first bottom end for connecting said pin to actuating means for bilaterally rotating said pin about an axis of rotation of said pin, substantially perpendicular to the axis of rotation of said wheels, the actuating means configured so that to a rotation of said pin on the axis of rotation of the pin corresponds a proportional variation of tilt of said movable coupling means with respect to the ground plane; and
    a second top end for a rotating coupling of said pin to said movable coupling means;
  said car further comprising independent driving means, each of said driving means suitable for driving a respective wheel, the driving means configured so that to a differential rotation of said wheels on said driving means corresponds a proportional rotation of said movable coupling means relative to said main chassis, about a substantially longitudinal axis of the pin.

2. The self-moving car according to claim 1, wherein said actuating means for bilaterally rotating said pin are jacks, each jack comprising a first end and a second end, each of said jacks connected, at the first end thereof, to said main chassis, and, at the second end thereof, to said bottom end of said pin.

3. The self-moving car according to claim 2, wherein said actuating means for bilaterally rotating said pin are a pair of telescopic pistons, symmetrically positioned on respectively opposite sides relative to the longitudinal axis of said pin, each of said pistons apt to cause a rotation on mutually opposite senses of said pin about said axis of rotation of the pin.

4. The self-moving car according to claim 1, wherein said actuating means for bilaterally rotating said pin about said axis of rotation of the pin respectively cause swinging of said pin, in a width range substantially from 0° to 15°.

5. The self-moving car according to claim 1, wherein coupling of said car with said machine is substantially rigid.

6. The self-moving car according to claim 1, wherein said wheels are a pair of wheels.

7. The self-moving car according to claim 6, wherein said pair of wheels are moved by respective independent engines, and wherein a joint rotation of said wheels with respective speeds of different value produces a proportional steering.

8. The self-moving car according to claim 6, wherein said pair of wheels are moved by respective independent engines, and wherein a joint rotation of said wheels in a mutually opposite sense produces a spinning motion of said car.

9. The self-moving car according to claim 1, wherein the car is equipped with a jockey wheel for stabilizing the balance of the car when the car is moved in a configuration devoid of a machine.

10. The self-moving car according to claim 9, wherein said jockey wheel is free to rotate idle about a vertical axis thereof and substantially perpendicular to the ground.

11. The self-moving car according to claim 9, wherein said jockey wheel is telescopic, and wherein the deployment of said jockey wheel is adjustable in height with a vertical translation, to obtain a proportional rotation of said car about a median point of an impression from a bearing down of said wheels.

12. The self-moving car according to claim 9, wherein said jockey wheel is positioned substantially in line with said wheels.

13. The self-moving car according to claim 1, wherein said movable coupling means comprises:
   a parallelogram arm hinged to said pin at said second top end; and
   a detachable coupling flange at said trailer machine.

14. The self-moving car according to claim 13, wherein said second top end for a rotating coupling comprises rotating supports for a rotation of said parallelogram arm.

15. The self-moving car according to claim 14, wherein said rotating supports are configured to allow an overall rotation of said movable coupling means with respect to said main chassis of up to 360°.

16. The self-moving car according to claim 13, wherein said parallelogram arm is moved by a telescopic hydraulic cylinder.

17. The self-moving car according to claim 13, wherein said detachable coupling flange is removable and interchangeable according to a configuration of a respective counterflange of said machine.

18. The self-moving car according to claim 13, wherein coupling of said detachable coupling flange is obtained by a system comprising pins apt to engage into respective slots.

19. The self-moving car according to claim 1, wherein the car is remote-controlled.

20. The self moving car of claim 15, wherein said overall rotation of said movable coupling means with respect to said main chassis is performed by rotating said movable coupling means of 180° in a first sense and of 180° in a second sense opposite the first sense.

* * * * *